Feb. 25, 1969  E. E. MALLORY ET AL  3,429,765
FORMER FOR BEAD BUILDING MACHINES OR THE LIKE
Filed Oct. 29, 1964
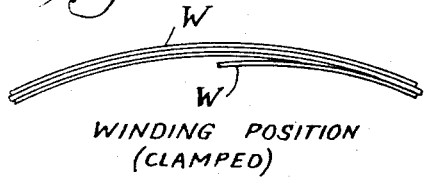
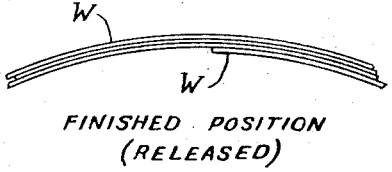
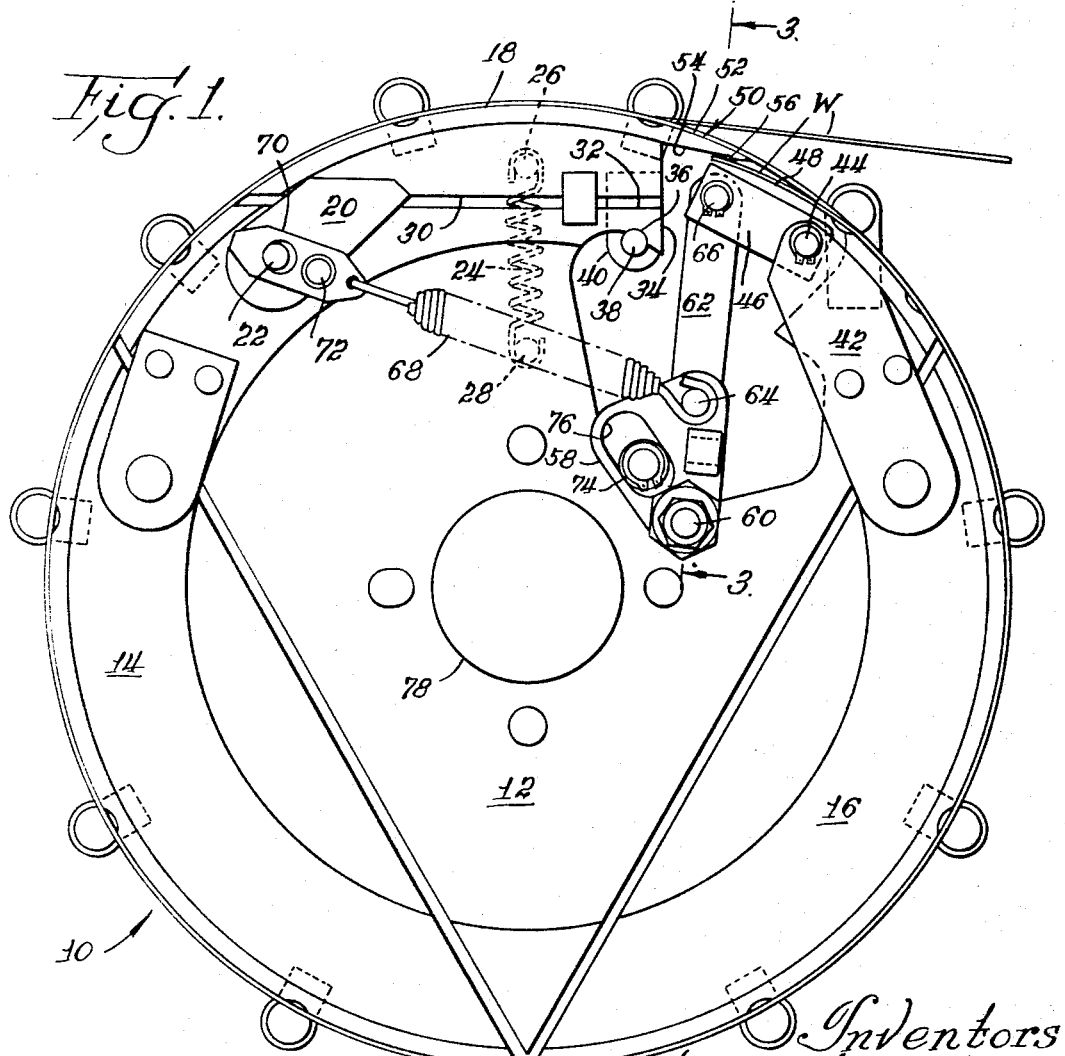
Inventors
Edwin E. Mallory
and Donald H. Shook Inventors
Edwin E. Mallory
and Donald H. Shook
By Brown, Jackson,
Boettcher & Dienner Att'ys United States Patent Office 3,429,765
Patented Feb. 25, 1969

3,429,765
FORMER FOR BEAD BUILDING MACHINES OR THE LIKE
Edwin E. Mallory and Donald H. Shook, Niles, Mich., assignors to National-Standard Company, Niles, Mich., a corporation of Delaware
Filed Oct. 29, 1964, Ser. No. 407,463
U.S. Cl. 156—422    5 Claims
Int. Cl. B29h 17/32

ABSTRACT OF THE DISCLOSURE

A former having wire gripping means for gripping the leading end of the wire at a location inwardly of but closely adjacent the periphery of the former on which the wire is wound in a manner to avoid any permanent set in the wire so that when the finished bead is removed from the former the leading end of the wire will spring outwardly against the main body of the bead.

---

This invention relates to tire bead winding apparatus and particularly to an improved former for winding rubberized wire into a plurality of superposed convolutions in the manufacture of inextensible bead cores for use in pneumatic tire casings. More specifically, the invention relates to improved gripping means on a former for gripping the leading end of a continuous length of wire which is supplied to the former whereby when the former rotates the wire will be wound thereon to form a tire bead.

In the manufacture of a tire bead, a rotatable former is positioned in a starting position and gripping means on the former is moved to an open position to receive the leading end of a continuous length of rubberized wire. Such wire is then supplied to the gripping means and the latter is moved to a gripping position to clamp the leading end of the wire. Thereafter, the former is rotated a predetermined number of revolutions to wind the wire around the former and thereby form a tire bead having a predetermined number of convolutions. The former is then stopped, the wire supply is severed, and after collapsing the former the completed wire bead is removed therefrom.

One of the problems encountered with the formers heretofore known is that in a completed tire bead the wire end which had been the leading end of the wire has a permanent set which necessitates a further operation to cause the wire end to lie against the main body of the head. That is, it is the leading end of the wire which is gripped by the gripping means on the former, and in order to accomplish such gripping the leading end of the wire is fed into the gripping means and held at a substantial distance radially inwardly from the periphery of the former on which the wire is wound during a bead winding operation. Consequently, the leading end of the wire where the wire is gripped is caused to project inwardly of the main body of the bead by a distance which is normally sufficient to produce a permanent set in the wire. Thus, when the finished bead is completed and removed from the former, the leading wire end will not spring outwardly against the main body of the bead, but will remain in a position where it projects inwardly from such body. In order to eliminate this hazard, a further operation is required to cause the wire end to lie closely adjacent the body of the bead. This may be performed on a machine which removes the permanent set by pressing the wire end against the body of the bead, or it may be accomplished by wrapping tape around the bead to hold the wire end in place.

It is an object of the present invention to eliminate the foregoing problem by providing a former having improved wire gripping means which grip the leading end of the wire at a location inwardly of but closely adjacent the periphery of the former on which the wire is wound, thereby avoiding any permanent set in the wire so that when the finished bead is removed from the former the leading wire end will spring outwardly against the main body of the bead.

In furtherance of the foregoing object we provide an improved former with novel gripping apparatus wherein the gripping member moves outwardly to grip the wire rather than inwardly. The gripper moves outwardly and presses the wire end against a projection on a collapsible former segment, and a stop is provided to limit the outward movement of the segment, whereby the wire end is pressed outwardly and clamped between the collapsible segment and the gripper. It is known to provide a pivotable gripping member which is rotated about a pivot to grip the leading end of the wire and simultaneously cause outward movement of a collapsible former segment. In such known structures, when the gripper rotates to its gripping position, one end of the gripper which moves generally radially inwardly does the gripping by pressing the wire end inwardly against a fixed portion of the former, while the opposite end of the gripper which moves generally radially outwardly engages a portion of the collapsible former segment to move the latter outwardly to its normal operative or expanded position. However, in such structures a relatively large recess must be provided in the periphery of the former in order to accommodate the gripping head of the pivotable gripper member, and the leading wire end must be disposed radially inwardly of the gripping head in order that the head can clamp the same against the former body as it moves inwardly. Consequently, the wire end must be disposed radially inwardly of the periphery of the former by a substantial distance which often causes a permanent set in the wire as discussed above. In accordance with the present invention such permanent set is eliminated since the gripper moves generally radially outwardly to grip the wire, and in addition the gripping head clamps the wire outwardly against a portion of the collapsible former segment so that it automatically expands the former segment to its outer operative position when the wire is gripped.

The foregoing and other objects and advantages of the invention will appear from the following description of a preferred embodiment thereof.

Now, in order to acquaint those skilled in the art with the manner of constructing and utilizing a former built in accordance with the principles of the present invention, we shall describe in conjunction with the accompanying drawings a preferred embodiment of the invention.

In the drawings:

FIGURE 1 is a side elevational view of a former equipped with wire gripper means constructed in accordance with the present invention, the gripper means being shown in gripping position, and a collapsible former segment being shown held in its radially outer operative position by the gripper means;

FIGURE 5 is a diagrammatic illustration of the relatively small angular relationship between the leading end of the wire which is gripped by the gripping means of the former and the overlying convolutions of wire which are wound around the periphery of the former to form the body of the head member; and FIGURE 6 is a diagrammatic illustration of the manner in which the leading end of the wire springs outwardly against the body of the tire bead after the completed bead is removed from the former.

Figure 2:
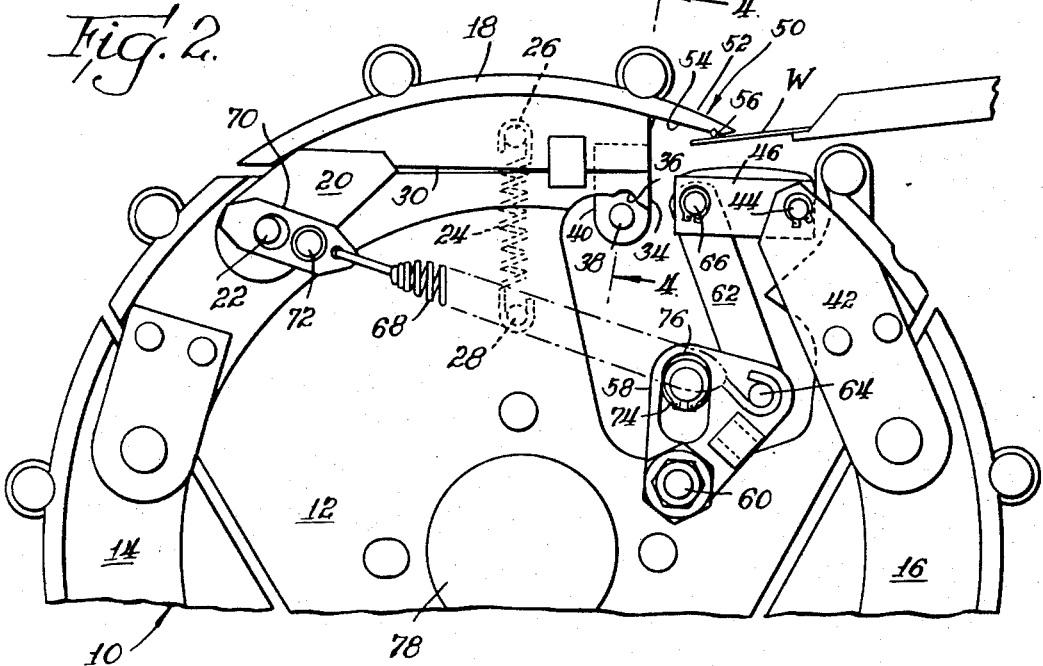
FIGURE 2 is a view similar to FIGURE 1 showing the wire gripper means in released position and showing the former segment in its radially inner collapsed position.

Referring now to the drawings, FIGURE 1 shows a former 10 having a main body 12, a pair of fixed former segments 14 and 16, and a collapsible former segment 18. The collapsible former segment 18 has a lug 20 fixed to one end, and a pivot pin 22 extends through the lug 20 and is fixedly mounted on the former body 12. Accordingly, the collapsible former segment 18 is pivotally mounted on the pivot pin 22 for movement between an extended outer position as shown in FIGURE 1 and a collapsed position as shown in FIGURE 2. A tension spring 24 has one end anchored on a stud 26 which projects from the collapsible former segment 18, and its other end is anchored to a stud 28 which is carried by the main body 12 of the former. The spring 24 thus biases the segment 18 inwardly to the collapsed position of FIGURE 2 wherein the inner surface 30 of the former engages against a flat outer surface 32 at the top of the former body portion 12. As will be explained more fully hereinafter, the segment 18 is expanded to its outer position of FIGURE 1 during the winding of a bead on the former 10, and is collapsed to its inner position of FIGURE 2 in order to permit a completed bead to be removed from the former.

Figure 4:
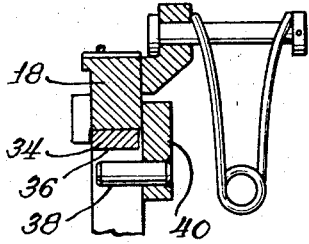
FIGURE 4 is a fragmentary sectional view, taken substantially along the line 4—4 of FIGURE 2, showing stop means for limiting the outward movement of the collapsible former segment.

In accordance with the present invention, the leading end of the wire is gripped by pressing the same outwardly against a projection on the collapsible segment 18, and thus it is necessary to provide stop means for limiting the outward movement of the segment. There is shown in FIGURES 1, 2 and 4 a hook 34 having a notch 36 formed therein. The hook 34 is integral with the former body 12 and projects therefrom for cooperation with a cross pin 38 carried by a lug 40 which projects approximately radially inwardly from the collapsible segment 18. Thus, the pin 38 is carried by the segment 18 and is disposed radially inwardly of the hook 34, whereby when the segment is moved outwardly the pin 38 will seat in the notch 36 to limit outward movement of the segment. As stated above, inward movement of the collapsible segment 18 will be stopped when the segment surface 30 engages against the flat surface 32 on the former body 12.

A lug 42 is fixedly mounted to the former body 12 and the fixed segment 16, and a pivot pin 44 is fixedly carried in the end of the lug. A gripper member 46 having a relatively smooth outer surface 48 is mounted at one end on the pin 44 for pivotal movement between a gripping position as shown in FIGURE 1 and a released position as shown in FIGURE 2. The collapsible segment 18 includes a relatively long and thin integral projection 50 having an outer surface 52 which is an extension of the arcuate outer surface of the segment, and an inner surface 54 which constitutes a gripping surface. A rectangular hardened gripper 56 may be affixed to the gripping surface 54 to assist in biting into the leading end of the wire for holding the same. As shown in FIGURE 2, the leading end of the wire W is fed into a position between the projection 50 on the former segment 18 and the gripper 46, and thereafter the gripper 46 is pivoted outwardly or in a clockwise direction to the position shown in FIGURE 1, whereby the wire end is clamped between the radially outer surface 48 on the gripper member 46 and the radially inner surface 54 on the projection 50 formed on the former segment 18.

Figure 3:
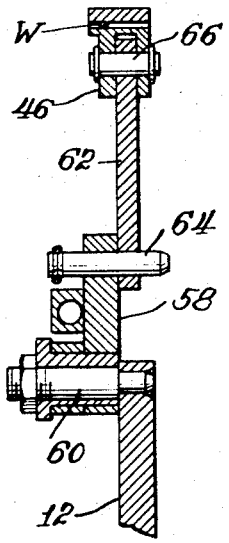
FIGURE 3 is a fragmentary sectional view, taken substantially along the line 3—3 of FIGURE 1, showing mechanism for actuating the pivotable wire gripper member.

A triangular shaped actuator 58 is pivotally mounted on the former body member 12 by a fixed pin 60 (see FIGURES 1, 2 and 3), and a relatively straight link member 62 is connected at one end to the actuator 58 by a pin 64 and at its opposite end to the gripper 46 by a pin 66. It will be understood that when the actuator 58 is in the pivotal position shown in FIGURE 1, the link 62 is substantially in its uppermost or radially outermost position so as to locate the gripper 46 in its radially outer gripping position wherein it will clamp the leading end of the wide W against the gripping surface 54, and more specifically against the square pin 56 in the particular embodiment being described. Furthermore, when the actuator 58 is rotated in a clockwise direction to the position of FIGURE 2, the link 62 is drawn radially inwardly somewhat so as to rotate the gripper 46 in a counterclockwise direction about its pivot pin 44 and thereby position the gripper in a released position as in FIGURE 2. The actuator 58 is biased to its counterclockwise position of FIGURE 1 by a tension spring 68 which has one end connected to the pin 64 carried by the actuator and its other end connected to the former body member 12 by an anchor link 70 and a pair of pins 22 and 72. The actuator 58 is moved to its clockwise or release position of FIGURE 2 by a cam-driven roller 74 which projects into a slot 76 formed in the actuator.

The former 10 rotates on a shaft 78, and a cam (not shown) may be mounted on the shaft for acting on the roller 74 to move the latter to the position of FIGURE 2 when it is desired to release the wire, and for cooperating with the roller 74 to permit the spring 68 to move the roller to the position of FIGURE 1 when it is desired to grip the wire. That is, the roller 74 may be mounted on a pivotable link or the like (not shown), and the cam (not shown) may be automatically moved about the shaft 78 relative to the former 10 in order to cam the roller to its desired position, such relative movement being effected at predetermined times in the cycle of operation. A cam arrangement suitable for automatically actuating the roller 74 between the position of FIGURE 1 and the position of FIGURE 2 is fully described in United States Patent 2,151,306, which issued to Florain J. Shook on Mar. 21, 1939, and is assigned to the assignee of the present invention. Accordingly, such cam structure is not a part of the present invention and is not described herein.

It is important to understand that the collapsible segment 18 is automatically extended to its radially outer position of FIGURE 1 when the leading end of the wire W is being clamped outwardly by the gripper member 46, and is automatically retracted to its radially inner position of FIGURE 2 whenever the wire W is released by the gripper 46. Thus, when the gripper 46 is moved in the clockwise direction about the pivot pin 44 to clamp the wire, the gripper presses generally radially outwardly on the end of the projection 50 on the segment 18 in order to clamp the wire thereagainst, thus moving the segment 18 in a counterclockwise direction about its pivot pin 22 until the stop pin 38 seats in the notch 36 formed in the hook member 34. Also, when the gripper 46 is moved to its counterclockwise position of FIGURE 2, the tension spring 24 moves the segment 18 in a clockwise direction about the pin 22 until the surface 30 on the segment abuts the surface 32 on the former body member 12.

As previously stated, one of the principal advantages of the former of the present invention is that it clamps the leading end of the wire at a location closely adjacent the periphery of the former 10 on which the several convolutions of wire are wound to form a tire bead, and thus no permanent set is produced in the wire end and it will snap outwardly against the body of the bead when a completed bead is removed from the former. Such gripping of the wire near the periphery of the former 10 is possible due to the unique gripping arrangement where the pivotally mounted gripper 46 effects gripping by pressing the wire end generally radially outwardly against the relatively thin projection 50 on the collapsible former segment 18. Thus, the wire end is spaced from the periphery of the former 10 only by the radial thickness of the thin projection 50 at the point of gripping. In addition, because the wire to be gripped is pressed outwardly against a projection on the segment 18, the segment 18 is automatically moved to its radially outer position whenever the wire end is clamped thereagainst. FIGURE 5 comprises an approximate illustration of the small angular relationship between the convolutions of a bead being wound on the formed 10 and the leading wire end which is gripped by the gripper member 46, and FIGURE 6 represents an illustration of the manner in which the wire end springs outwardly against the body of the bead after a completed bead is removed from the former.

While we have illustrated our invention in a preferred form, we do not intend to be limited to such form, except insofar as the appended claims are so limited, since modifications coming within the scope of our invention will be readily suggested to others with our disclosure before them.

We claim:

1. In a rotatable former for a tire bead winding machine or the like, gripping mechanism for gripping the leading end of a wire to be wound on the former, said gripping mechanism comprising, in combination, a first gripping member comprising a generally tangential projection at the periphery of the former, said projection having a radially outer surface comprising a portion of the periphery of the former and a radially inwardly facing first gripping surface, and said projection being relatively thin in the radial direction so that said first gripping surface is proximate the periphery of the former, a second gripping member movably mounted on the former and having a second gripping surface which faces approximately radially outwardly generally toward said first gripping surface, said second gripping member being movable on the former between a release position wherein said second gripping surface is spaced from said first gripping surface and a gripping position wherein said second gripping surface is urged generally radially outwardly against said first gripping surface to clamp a leading wire end therebetween, and actuating means for moving said second gripping member between said release position and said gripping position.

2. In a rotatable former for a tire bead winding machine or the like, gripping mechanism for gripping the leading end of a wire to be wound on the former, said gripping mechanism comprising, in combination, a first gripping member comprising a generally tangential projection at the periphery of the former, said projection having a radially outer surface comprising a portion of the periphery of the former and a radially inwardly facing first gripping surface, and said projection being relatively thin in a radial direction so that said first gripping surface is proximate the periphery of the former, a second gripping member pivotally mounted on the former and having a second gripping surface which faces approximately a second gripping surface which faces approximately radially outwardly generally toward said first gripping surface, said second gripping member being pivotable between a release position wherein said second gripping surface is spaced from said first gripping surface and a gripping position wherein said second gripping surface is urged generally radially outwardly against said first gripping surface to clamp a leading wire end therebetween, and actuating means for moving said second gripping member between said release position and said gripping position.

3. In a rotatable former for a tire bead winding machine or the like, said former being of the type having gripping mechanism for gripping the leading end of a wire to be wound on the former, the improvement comprising, in combination, a former body, a collapsible former segment pivotally mounted on the former body and having a radially outer surface which when the segment is extended comprises a portion of the periphery of the former, said collapsible segment being pivotable between a radially extended position as when wire is being wound on the former and a radially collapsed position as when it is desired to remove a completed bead from the the former, a first gripping member comprising a generally tangential projection on said collapsible former segment at the periphery of the former, said projection having a radially outer surface comprising a portion of the periphery of the former and a radially inwardly facing first gripping surface, and said projection being relatively thin in the radial direction so that said first gripping surface is proximate the periphery of the former, a second gripping member movably mounted on said former body and having a second gripping surface which faces approximately radially outwardly generally toward said first gripping surface, said second gripping member being movable on said former body between a release position wherein said second gripping surface is spaced from said first gripping surface and a gripping position wherein said second gripping surface is urged generally radially outwardly against said first gripping surface to clamp a leading wire end therebetween and also to force said former segment to its extended position, and actuating means for moving said second gripping member between said release position and said gripping position.

4. In a rotatable former for a tire bead winding machine or the like, said former being of the type having gripping mechanism for gripping the leading end of a wire to be wound on the former, the improvement comprising, in combination, a former body, a collapsible former segment pivotally mounted on the former body and having a radially outer surface which when the segment is extended comprises a portion of the periphery of the former, said collapsible segment being pivotable between a radially extended position as when wire is being wound on the former and a radially collapsed position as when it is desired to remove a completed bead from the former, a first gripping member comprising a generally tangential projection on said collapsible former segment at the periphery of the former, said projection having a radially outer surface comprising a portion of the periphery of the former and a radially inwardly facing first gripping surface, and said projection being relatively thin in the radial direction so that said first gripping surface is proximate the periphery of the former, at second gripping member pivotally mounted on said former body and having a second gripping surface which faces approximately radially outwardly generally toward said first gripping surface, said second gripping member being pivotable between a release position wherein said second gripping surface is spaced from said first gripping surface and a gripping position wherein said second gripping surface is urged generally radially outwardly against said first gripping surface to clamp a leading wire end therebetween and also to force said former segment to its extended position, and actuating means for moving said second gripping member between said release position and said gripping position.

5. In a rotatable former for a tire bead winding machine or the like, said former being of the type having gripping mechanism for gripping the leading end of a wire to be wound on the former, the improvement comprising, in combination, a former body, a collapsible former segment pivotally mounted on the former body and having a radially outer surface which when the segment is extended comprises a portion of the periphery of the former, said collapsible segment being pivotable between a radially extended position as when wire is being wound on the former and a radially collapsed position as when it is desired to remove a completed bead from the former, a first gripping member comprising a generally tangential projection on said collapsible former segment at the periphery of the former, said projection having a radially outer surface comprising a portion of the periphery of the former and a radially inwardly facing first gripping surface, and said projection being relatively thin in the radial direction so that said first gripping surface is proximate the periphery of the former, a second gripping member pivotally mounted on said former body and having a second gripping surface which faces approximately radially outwardly generally toward said first gripping surface, said second gripping member being pivotable between a release position wherein said second gripping surface is spaced from said first gripping surface and a gripping position wherein said second gripping surface is urged generally radially outwardly against said first gripping surface to clamp a leading wire end therebetween and also to force said former segment to its extended position, first and second interengaging stop means carried respectively on said former body and on said collapsible segment for limiting the radially outward movement of said collapsible segment relative to said former body, and actuating means for moving said second gripping member between said release position and said gripping position.

References Cited

UNITED STATES PATENTS

| | | | |
|---|---|---|---|
| 1,618,131 | 2/1927 | Schnedarek | 156—422 |
| 1,665,853 | 4/1928 | Leguillon | 156—422 |
| 1,927,811 | 9/1933 | Stevens | 156—422 |
| 1,986,094 | 1/1935 | Allan | 156—422 X |
| 2,382,672 | 8/1945 | Shook | 156—422 |
| 2,979,109 | 4/1961 | Dieckmann | 156—422 |
| 3,051,221 | 8/1962 | Strozewski | 156—422 |
| 3,057,566 | 10/1962 | Braden | 156—422 X |

EARL M. BERGERT, *Primary Examiner.*

C. B. COSBY, *Assistant Examiner.*

U.S. Cl. X.R.

156—136